(12) United States Patent
Nishimura et al.

(10) Patent No.: US 7,745,032 B2
(45) Date of Patent: Jun. 29, 2010

(54) FUEL CELL WITH HUMIDIFIER

(75) Inventors: Katsunori Nishimura, Hitachiota (JP);
Jinichi Imahashi, Hitachi (JP); Kenji Yamaga, Hitachi (JP); Masahiro Komachiya, Hitachinaka (JP); Makoto Morishima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 10/686,480

(22) Filed: Oct. 16, 2003

(65) Prior Publication Data
US 2005/0084731 A1 Apr. 21, 2005

(30) Foreign Application Priority Data
Oct. 18, 2002 (JP) ............................... 2002-303699

(51) Int. Cl.
*H01M 8/04* (2006.01)
(52) U.S. Cl. ............................... 429/34; 429/38; 429/39
(58) Field of Classification Search ........................ None
See application file for complete search history.

(56) References Cited

U.S. PATENT DOCUMENTS

| 4,909,810 | A * | 3/1990 | Nakao et al. ................... 95/52 |
| 6,649,297 | B1 * | 11/2003 | Marchand et al. ............. 429/34 |
| 2001/0004501 | A1 * | 6/2001 | Yi et al. ........................ 429/34 |
| 2001/0046616 | A1 * | 11/2001 | Mossman ..................... 429/13 |
| 2003/0087982 | A1 * | 5/2003 | Kanazawa ................... 522/49 |

FOREIGN PATENT DOCUMENTS

| JP | 05-041230 | 2/1993 |
| JP | 6-124722 | 5/1994 |
| JP | 7-65845 | 3/1995 |
| JP | 07-135012 | * 5/1995 |
| JP | 07-320753 | * 12/1995 |
| JP | 08-138704 | * 5/1996 |
| JP | 8-138704 | 5/1996 |
| JP | 8-138705 | 5/1996 |

(Continued)

OTHER PUBLICATIONS

DuPont Fuel Cells—DuPont Nafion PFSA Membranes NE-1135, N-115, N-117, NE-1110 Properties of Nafion PFSA Membrane.*

(Continued)

*Primary Examiner*—Jonathan Crepeau
*Assistant Examiner*—Tony Chuo
(74) *Attorney, Agent, or Firm*—Antonelli, Terry, Stout & Kraus, LLP.

(57) ABSTRACT

The fuel cell assembly disclosed includes at least one unit fuel cell comprising a separator having flow channels for oxidizing gas, a cathode to which the oxidizing gas is fed, a membrane electrolyte of proton conductivity, an anode to which fuel gas is fed, and a separator having flow channels for the fuel gas, the above members being arranged in order. The fuel cell assembly further comprises a humidifier having a porous member to humidify at least the fuel gas to be fed to the anode. The porous member of the humidifier is so disposed as to face at least the flow channels for the oxidizing gas so that water is supplied to the flow channels from part of the surface of the porous member opposite to the water supplying face and/or from the outer periphery of the porous member.

28 Claims, 6 Drawing Sheets

FOREIGN PATENT DOCUMENTS

| JP | 08-138705 | * | 5/1996 |
| JP | 8-250130 | | 9/1996 |
| JP | 9-92308 | | 4/1997 |
| JP | 11-185777 | | 7/1999 |
| JP | 2000-173633 | * | 6/2000 |
| JP | 2001-185169 | | 7/2001 |

OTHER PUBLICATIONS

Japanese Official Action (Translation) for Japanese Patent Application No. JP2002-303699, issued Apr. 4, 2006.

* cited by examiner

FUEL CELL WITH HUMIDIFIER

BACKGROUND OF THE INVENTION

1. Field of the Invention

This invention relates to fuel cells, particularly to polymer electrolyte fuel cells.

2. Related Art

A polymer electrolyte fuel cell (hereinafter called PEFC) that uses a polymer electrolyte has merits of high output, long service life, little deterioration by starting and stopping, low operating temperature (approx. 70 to 80° C.) and needs no precise differential pressure control, etc. Therefore, it has a very wide range of applications such as power supplies for electric automobiles, distributed power supplies for industrial or business use and home use and so on.

A unit fuel cell of the PEFC comprises a membrane-electrode assembly (hereinafter called MEA) having a proton exchange membrane (hereinafter called PEM), which is proton-conductive sandwiched between porous electrodes coated with platinum or alloy catalyst such as platinum-ruthenium alloy and a unit cell separator having gas flow channels which supply hydrogen gas to the anode and air (oxygen) to the cathode, respectively.

The PEM must be wet to a certain level to let protons move. To keep the PEM wet, a humidified fuel gas is usually fed to the anode or cathode. Various mechanisms have been proposed as apparatus to humidify fuel gases (for example by patent documents 1 to 7 shown below).

A humidifying mechanism using only a water permeable membrane has a problem that hydrogen gas bubbles passing through the water permeable membrane gather in the water supply side and prevent water from passing through the membrane. To solve this problem, a method has been disclosed in patent document 4, which comprises providing a platinum catalyst layer in the water supply side of the membrane, causing the hydrogen gas passing through the membrane to react with the oxygen gas dissolved in the supplied water, and thus eliminating hydrogen bubbles.

Patent document 1: Japanese Application Patent Laid-Open Publication No. 06-124722 (Page 3, FIG. 4)

Patent document 2: Japanese Application Patent Laid-Open Publication No. 07-65845 (Page 2, FIG. 9)

Patent document 3: Japanese Application Patent Laid-Open Publication No. 08-138704 (Page 3, FIG. 2)

Patent document 4: Japanese Application Patent Laid-Open Publication No. 08-138705 (Page 2, FIG. 4)

Patent document 5: Japanese Application Patent Laid-Open Publication No. 08-250130 (Page 4, FIG. 7)

Patent document 6: Japanese Application Patent Laid-Open Publication No. 09-92308 (Page 5-6, FIG. 1)

Patent document 7: Japanese Application Patent Laid-Open Publication No. 11-185777 (Page 3, FIG. 5).

However, a humidifier using a conventional water permeable membrane has a problem that the pressure difference between the fuel gas and the cooling water that passes through the water permeable membrane will make the membrane project towards the low-pressure side during power generation. This membrane projection will narrow the fuel gas flow channels and reduces the flows of the fuel gas and the cooling water.

As a result, auxiliary devices that supply the cooling water and the fuel gas consume more power to supply them against the pressure loss. This reduces the efficiency of the fuel cell system including the auxiliary machines and the fuel cell.

SUMMARY OF THE INVENTION

The PEFC that is an embodiment of this invention basically includes a plurality of unit cells each of which comprises a membrane electrode assembly (MEA) and unit cell separators which sandwich the MEA. These unit cells and cooling water separators are connected in series (into a laminated unit cell structure) to generate enough electric power. The MEA comprises an anode having a catalyst and being porous, a solid polymer electrolyte having proton conductivity and a cathode having a catalyst and being porous, the members being laminated.

The PEFC of the invention is provided with a humidifier having a porous material, wherein cooling water is supplied to the membrane from part of its surface opposite to the water supplying surface of the porous member and/or from the outer periphery of said porous member. The cooling water is supplied to humidify the fuel gas from the water supplying surface towards the gas flow channels.

BRIEF DESCRIPTION OF THE DRAWINGS

FIG. 1b is an enlarged sectional view of the encircled part with a dotted circle in FIG. 1a.

DETAILED DESCRIPTION OF THE INVENTION

Description of the Preferred Embodiments

This invention will be described in further detail by way of embodiments

Embodiment 1

Figure 1B:
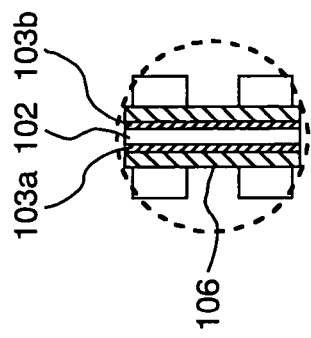
Figure 1A:
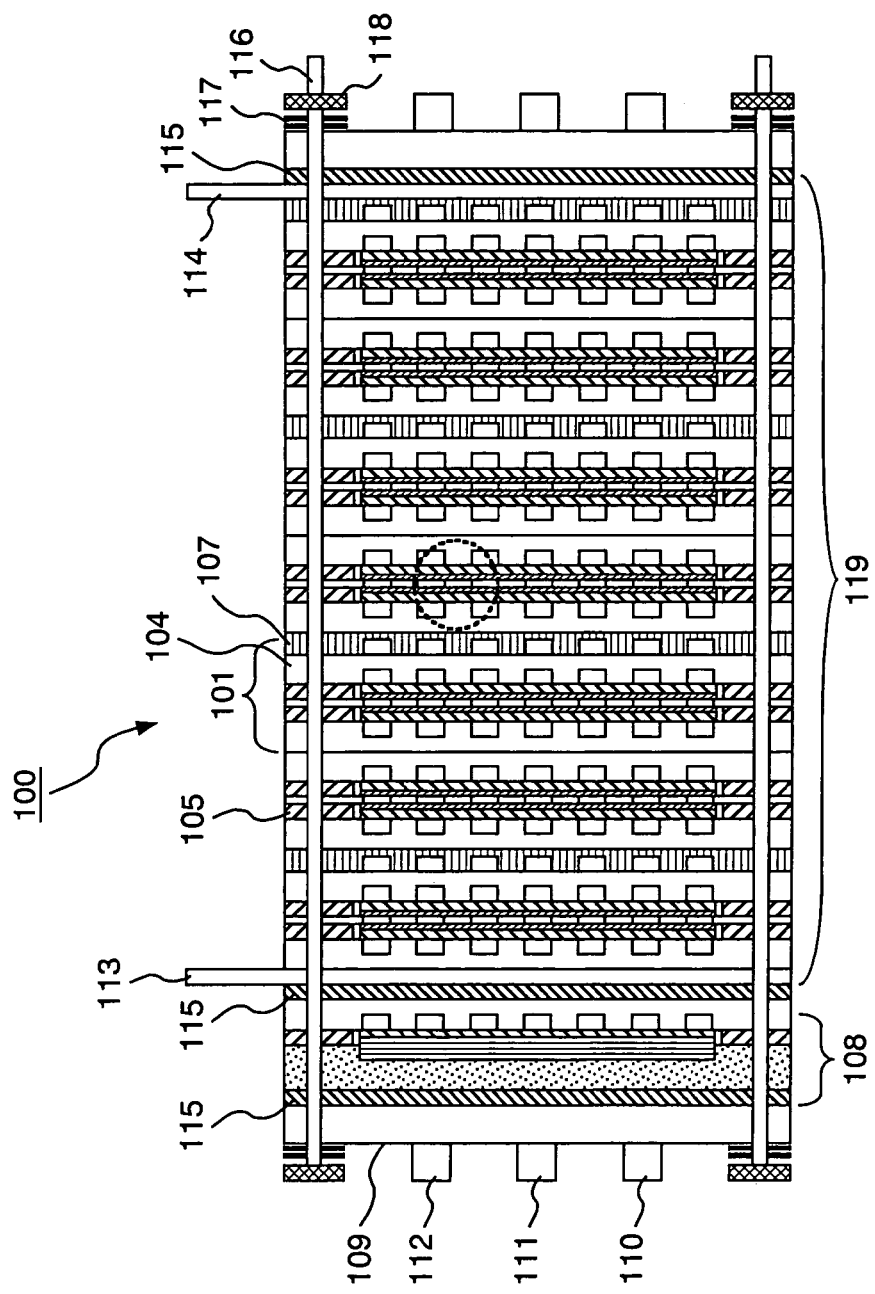
FIG. 1a shows a cross-sectional view of a PEFC of this invention, equipped with a humidifier.

FIG. 1 shows a schematic diagram of the PEFC. The PEFC 100 comprises unit cells 101 each of which comprises MEA shown in FIG. 1a and having a positive electrode 103a on one side thereof and a negative electrode 103b on the other side, two gas diffusion layers 106 in contact with these electrodes (103a and 103b), and two unit cell separators 104 which sandwich the gas diffusion layers from the outside thereof, and cooling water separators 107 with one surface grooved to flow cooling water which sandwich every two sets of the above unit cells in series. This structure is called a unit cell assembly 119.

The gas diffusion layer is provided to assure water drainage ability, gas diffusion ability, and current collection ability.

A gasket 105 is inserted into a space between two unit cell separators 104 to prevent leakage of the fuel gas.

There are two kinds of fuel gases used in the PEFC: anode gas that is supplied to the positive electrodes and cathode gas that is supplied to the negative electrodes. Hydrogen gases obtained by modifying methane and gases that contain hydrogen are used as anode gases. Gases such as air that contain oxygen are used as cathode gases.

Generally used as PEM 102 is a membrane of fluoropolymer whose part of fluorine atoms in the pendant alkyl chains are substituted with sulphonic groups. Any polymer can be used as long as it has a function of moving hydrogen ions (protons). One of such polymer membranes is, for example, a polytetrafluoroethylene membrane prepared by substituting parts of fluorine atoms in tetrafluoroethylene as repeating units with alkyl chains having 2 to 5 units of —$CF_2$— and/or —$CF_2(CF_3)$—, etc., the fluorine atoms in the alkyl chains being further substituted with sulfonic groups (—$SO_3H$).

The positive electrodes 103a and the negative electrodes 103b are molded from a mixture of catalyst (platinum or alloy of different kinds of elements such as platinum and ruthenium), carbon powder, and binder.

At the anode 103a, the oxidation of hydrogen (Formula 1) is going on. At the cathode 103b, the reduction of oxygen (Formula 2) is going on. The hydrogen ions (proton) produced by the oxidation of hydrogen at the anode 103a travel to the PEM 102. The PEM receives the hydrogen ions and emits electrons. The electrons flow through an external load towards the cathode and work to combine the hydrogen ions and oxygen there into water.

$$H_2 \rightarrow 2H^+ + 2e^- \quad \text{(Formula 1)}$$

$$2H^+ + \tfrac{1}{2}O_2 + 2e^- \rightarrow H_2O \quad \text{(Formula 2)}$$

These reactions are accompanied by diffusion of gases and movement of hydrogen ions. These movements of substances generate resistances and cause a voltage drop of the PEFC. To suppress this voltage drop, the electrodes and the PEM must be thinner (to several hundred microns). Therefore, the MEA comprising a PEM sandwiched by electrodes is used.

Cooling water is supplied to the cooling-water separator 107 from a cooling water pump 615 (FIG. 6) that is placed outside the PEFC 100. This cooling water deprives the PEFC of the generated heat, and becomes warm. This warm water can be used for home use.

Further the PEM contains hydrogen ions that can move in the membrane but their movement is very slow when the membrane is dry. When the PEM is wet, water carries the hydrogen ions with it and consequently, the hydrogen ions move faster. A method of humidifying fuel gases is employed to humidify the PEM. The water to humidify fuel gases is called "humidifying water." The humidifying water is part of water supplied by the cooling water pump 615 (FIG. 6) through the cooling water port 111 on the end plate 109.

The gas for the anode 103a is supplied through the anode gas supply port 110. Usually, the humidifier 108 is provided next to the anode gas flow channels to humidify the gas. The gas for the cathode 103b is supplied through the cathode gas supply port 112.

A fuel cell assembly is built up by placing unit cells 101 in series, connecting current-collecting plates with output terminals (hereinafter called collectors) 113, and 114 to which an external load is connected to take out electric power to both ends of the serial set of unit cells, placing an insulating plate between each collector (113 or 114) and the end plate 109 to electrically insulate the end plates from collectors, placing unit cells 101, cooling water separators 107, the humidifier 108, and collectors 113 and 114 in parallel, and fixing them together with bolts 116, conical spring washers 117, and nuts 118.

Figure 2:
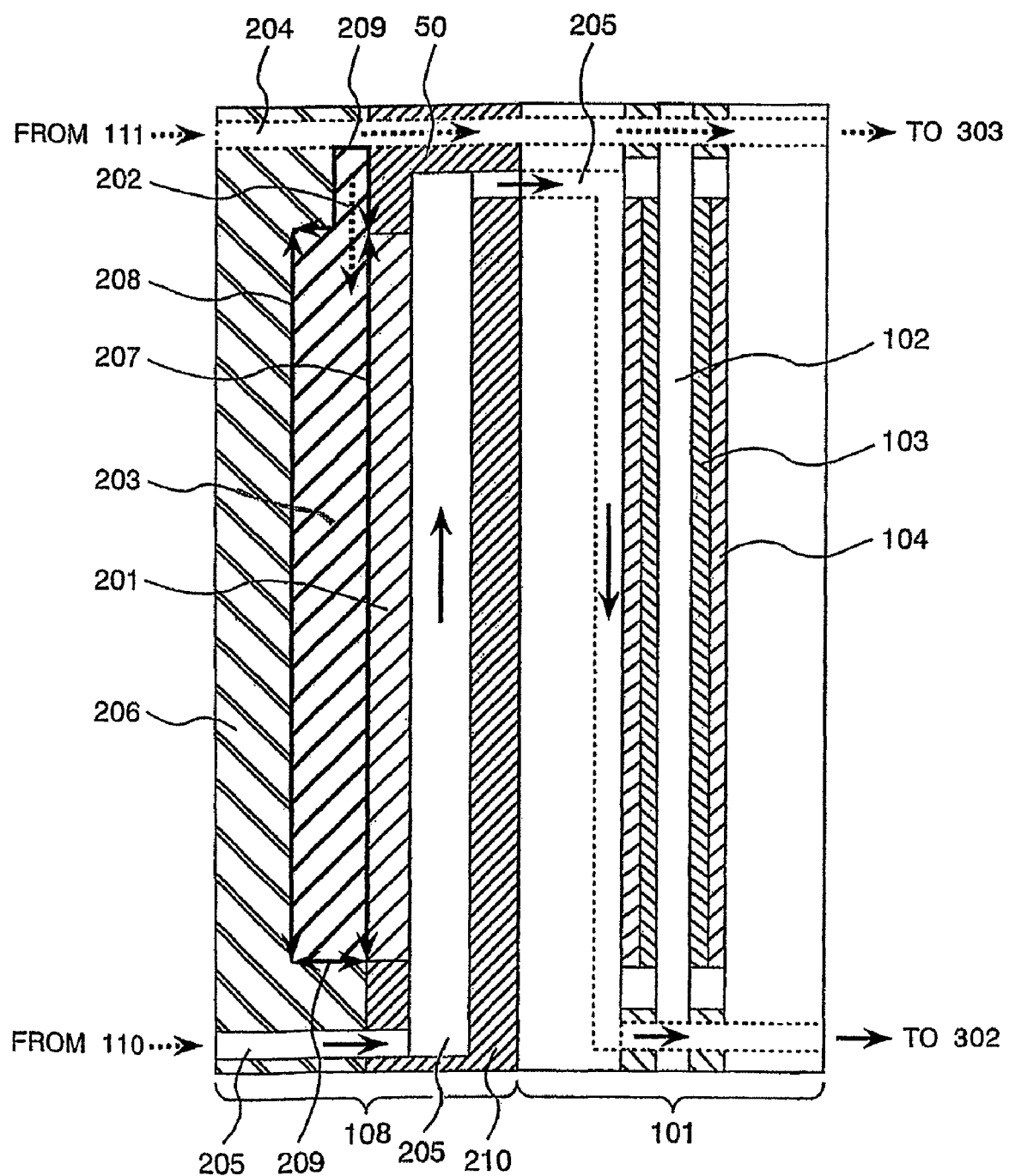
FIG. 2 shows a cross-sectional view of a humidifier of this invention and its vicinity.

FIG. 2 shows a magnified cross-sectional view of the humidifier 108 of FIG. 1 and its vicinity to show the detailed inside structure of the humidifier.

The humidifier 108 comprises a water permeable membrane 201 that can transfer water, a water retaining layer 203, and a holder 206 for holding the layer 203.

The water retaining layer 203 is a porous material that stores (holds) water in it and discharges water to the surrounding according to the humidity transition in the environment of the water supplying surface and its vicinity.

The cooling water that recovers heat generated in the unit cells 101 is supplied to the cooling water flow channel 204 that passes through the humidifier 108 via the cooling water port 111 of FIG. 1 by the cooling water pump 615 (FIG. 6) provided outside the PEFC 100. Part of this cooling water is diverted as humidifying water to humidify the anode gas from the humidifying water inlet 202 into the water retaining layer 203 and retained in micro-pores of the water retaining layer 203. This embodiment carries out retaining of the humidifying water by the capillary action. When the PEFC 100 works, part of the water held in the water retaining layer 203 is taken by the anode gas that flows near the water supplying surface 207 of the water retaining layer 203 against the capillary force and humidifies the anode gas. The humidified anode gas moves into the unit cell 101 through the anode gas flow channel 205 and humidifies the PEM 102. The wet PEM 102 facilitates the movement of hydrogen ions in the PEM 102.

When the PEFC 100 stops, the anode gas flow stops and the anode gas flow near the water supplying surface 207 becomes less than that when the PEFC 100 is working. Accordingly, the humidifying water held in the water retaining layer 203 remains held in micro-pores of the water retaining layer 203 by the capillary force. This can prevent the anode gas from being humidified too much and reduce the humidity of the anode gas. In other words, only when the PEFC is working, the anode gas can be humidified.

This can also prevent the water retaining layer 203 from projecting towards the gas flow channel, which always occurs when the cooling water is supplied from part of a surface opposite to the water supplying surface of the water retaining layer 203 and/or from the outer edge of the water retaining layer 203.

In FIG. 2, the surface 207 is the water supplying surface of the water retaining layer 203 and the surface 208 is the surface opposite to the water supplying surface. The portion 209 is the outer edge of the water retaining layer 203. It includes all surfaces of the water retaining layer 203 except the water supplying surface 207 and the surface 208 opposite to the water supplying surface.

There are various ways to supply water to the water retaining layer: water supply by a pump or water supply from a water tank by the gravitational force. However, a preferable water supply method is making part of the water retaining layer in contact with the cooling water of the PEFC as in the humidifying water inlet 202 and causing part of the cooling water to osmose into the water retaining layer by the capillary action. Particularly, this method is more preferable because the heat generated by the PEFC can be used for supply of the humidifying water.

Materials fit for the water retaining layer can be hydrophilic polymer materials that can hold enough water, for example, hydrophilic polymer material, carbonaceous porous material, or compound thereof.

Typical hydrophilic polymer materials are of sponge-like sheets such as polypropylene non-woven cloth and polyethylene-polypropylene non-woven cloth. These materials are made hydrophilic by sulfonation. The proton substitution type sulfonation is preferable. If the sulfonation of substitution type of the other ion such as alkali metal (Li, Na, K, etc.) and alkali earth metal (Ca, etc.) is made, these hydrated metal ions are dissolved in water and carried by the anode gas to the PEM 102. The alkali metal ions react with hydrogen ions in the PEM 102 and the resulting product increases the resistance of the PEM 102. Consequently, this reduces the power generating performance of the PEM 102.

The average micro-pore diameter (R) of the porous material for the water retaining layer 203 can be expressed by $$R=\gamma \cos \theta / \Delta P$$

wherein $\Delta P$ is a difference between the pressure of cooling water supplied by the cooling water pump 615 (FIG. 6) or water to cool the PECF and the pressure of anode gas.

$\theta$ is a contact angle of water on the micro-pore surface.

$\gamma$ is a surface tension of water.

In the above expression, for example, let's assume that the porous material is hydrophilic and completely wettable with water. In this case, the contact angle ($\theta$) can be approximate to zero. Judging from the necessity to reduce the power consumption of the cooling water pump 615 (FIG. 6), the pressure of the cooling water supplied to the PEFC should preferably be in the range of 1 to 10 KPa. When the water pressure is 1 KPa, the average micro-pore radius is 130 microns (that is, the average micro-pore diameter is 260 microns). When the water pressure is 10 KPa, the average micro-pore radius is 13 microns (that is, the average micro-pore diameter is 26 microns).

As the result, it is preferable that the water retaining layer 203 is a hydrophilic porous material that can hold water quickly and that the average micro-pore diameter is in the range of 10 to 300 microns. In this case, this micro-pore size is a maximum micro-pore diameter and preferably causes a pressure higher than the cooling water pressure in the capillaries. In other words, the micro-pore diameter R should preferably be equal to or smaller than the function R(X) of the cooling water pressure $\Delta P$. Particularly, it is experimentally known that, when the micro-pore diameter is in the range of 30 to 200 microns, the humidifier 108 can reject excessive water and the almost saturated humidity can be obtained.

The thickness of the water retaining layer should preferably be in the range of 50 to 300 microns. We inventors experimentally found that it is possible to reduce the quantity of supply of the humidifying water by compressing the humidifying water inlet 202 so that the thickness of the humidifying water inlet 202 may be about ½ to ¾ of the thickness of the water retaining layer and that the gas can be humidified to required degrees according to the flow rate of the fuel gas.

The compression of the humidifying water inlet 202 is dependent upon the flow rate of a gas to be humidified or the flow rate of water used for humidification of the gas. The quantity of compression is reduced to increase the flow rate of water.

This embodiment uses a hydrophilic polyethylene-polypropylene non-woven cloth of 180 microns thick and 30 microns in average micro-pore diameter as the water retaining layer 203. The surface of the non-woven cloth is plasma-processed to have oxygen groups (=O, —OH, etc.) to make it hydrophilic. With this, the water retaining layer becomes hydrophilic.

Although this embodiment employs a plasma method to make the water retaining layer hydrophilic, the similar effect can be obtained by substituting part or all hydrogen atoms of polyethylene by fluorine atoms and substituting these fluorine atoms by sulfonic groups.

We can monitor the shapes of micro-pores of the water retaining layer 203 by a scanning electron microscope. Generally, most micro-pores of the water retaining layer have indefinite shapes.

The micro-pore diameters of the water retaining layer 203 can be determined by taking microscopic images of the surface of the water retaining layer 203 by a scanning electron microscope, calculating the area of each micro-pore by image processing of the microscopic images, obtaining a circle having the same area, and calculating its diameter. The average micro-pore diameter is the average of the above micro-pore diameters. However, as the scanning electron microscope can hardly monitor surfaces of insulating materials, the other method can be employed to determine the micro-pore diameters of insulating materials. In other words, the cross-sectional area of each micro-pore of an insulating material can be estimated by filling the micro-pores with a conductive resin by pressure injection and observing the surface of the material by the scanning electron microscope.

The average diameter can be obtained by taking a microscopic image of the center area 308 (the hatched area in FIG. 3) of the water supplying surface 207 of the water retaining layer which is in contact with the fuel gas by a scanning electron microscope, measuring the micro-pore size distribution in the microscopic image (photo), and calculating the average of the micro-pore diameters. The viewing field of the scanning electron microscope for measurement of a micro-pore size distribution is dependent upon the shape of the fuel gas flow channel. It should be an area at which the fuel gas is actually humidified by the water retaining layer 203 and preferably be an area at which the fuel gas is humidified most easily. In other words, it should be an area that is greatest in the gas-contact time and area. In a certain shape of the fuel gas flow channel, the area should be the center of the water supplying area 207 or its vicinity where the fuel gas is actually humidified by the water retaining layer 203.

Various hydrophilic polymer membranes can be used as the water permeable membrane 201. They can be proton type ion exchange resin membranes, hydrophilic olefin membranes, sulfonated polystyrene membranes, and styrene sulfonic acid membranes. For example, the PEM 102 is used as a polymer membrane which is prepared by substituting parts of fluorine atoms in tetrafluoroethylene repeating units of polytetrafluoroethylene polymer with alkyl chains having 2 to 5 of —$CF_2$— and/or —$CF_2(CF_3)$—, etc., the fluorine atoms being substituted with sulfonic groups (—$SO_3H$).

As the heat resisting properties, the water permeable membrane must have at least higher melting and softening points than the operating temperature of the PEFC. As the PEFC 100 uses water to cool the cell, the water permeable membrane should preferably has a melting point of 100° C. or higher.

This embodiment uses, as the water permeable membrane 201, a polymer membrane prepared by substituting parts of fluorine atoms in polytetrafluoroethylene polymer with alkyl chains having 2 to 5 —$CF_2$— and/or —$CF_2(CF_3)$—, etc., the fluorine atoms being substituted with sulfonic groups (—$SO_3H$).

The thickness of the water permeable membrane 201 in this embodiment affects the humidity of the fuel gas. As the thickness of the membrane in which water moves becomes smaller, the humidification rate increases. In this range, the water and the gas must be separated from each other. Therefore, the thickness of the membrane must be in the range of 10 to 100 microns and preferably in the range of 20 to 50 microns. The reason for the low membrane thickness limit of 10 microns is that the thinner thickness may not keep the strength of the membrane. Similarly, the reason for the high membrane thickness limit of 100 microns is that the greater thickness may increase the travel of water and reduce the humidification rate.

As the result, this embodiment employs the water permeable membrane 201 of 30 microns thick.

Further, the water permeable membrane 201 should preferably be formed on the water supplying surface 207 of the water retaining layer 203 by a method such as bonding, joining, and contact. One bonding example is applying a small amount of monomer that is the raw material of the water permeable membrane 201 or ion exchange resin as the adhesive to the surface of the water permeable membrane 201 and attaching the water permeable membrane to the water retaining layer 203. This adhesive can be of any material as long as it does not prevent water from moving to the water permeable membrane 201 from the water retaining layer 203. It is also possible to join the water permeable membrane 201 to the surface of the water retaining layer 203 by compressing, heating, or the other joining means.

In this embodiment, the water permeable membrane 201 is bonded to the water retaining layer 203 with a small amount of monomer of the polymer membrane as an adhesive therebetween.

The surface of the water permeable membrane 201 should be finely jagged to increase the specific surface area of the wet membrane with which the anode gas is in contact and to increase the humidification rate. This can make the whole humidifier 108 smaller and also reduce the dimensions of the whole PEFC 100. The water permeable membrane 201 can have any patterned intended surface such as pleated surface and sponge-like surface as long as it is finely jagged.

Further, it is possible to change the humidification rate of the anode gas according to the flow rate of the fuel gas by changing the micro-pore sizes of the water permeable membrane 201. In other words, when the micro-pore size of the water permeable membrane 201 becomes smaller, the humidification rate of the anode gas decreases. Contrarily, when the micro-pore size becomes greater, the humidification rate of the anode gas increases.

This embodiment applied cooling water of 70° C. to the water permeable membrane 201 of 0.03 micron in average micro-pore diameter and porosity of 0.7. Under this condition, the water permeable membrane 201 can humidify the anode gas to the saturated vapor pressure at 65° C. Here, the porosity is defined as the result of "1 minus the quotient of division of apparent density by true density."

The water retaining layer 203 and the water permeable membrane 201 are held by water retaining layer holder 206 made of graphite. Generally, the holder 206 should be as big as the separator of the fuel cell and the area of the water retaining layer 203 is limited. Therefore, if one water retaining layer is not enough for humidification, two or more water retaining layers can be used to increase the humidification rate.

Figure 5:
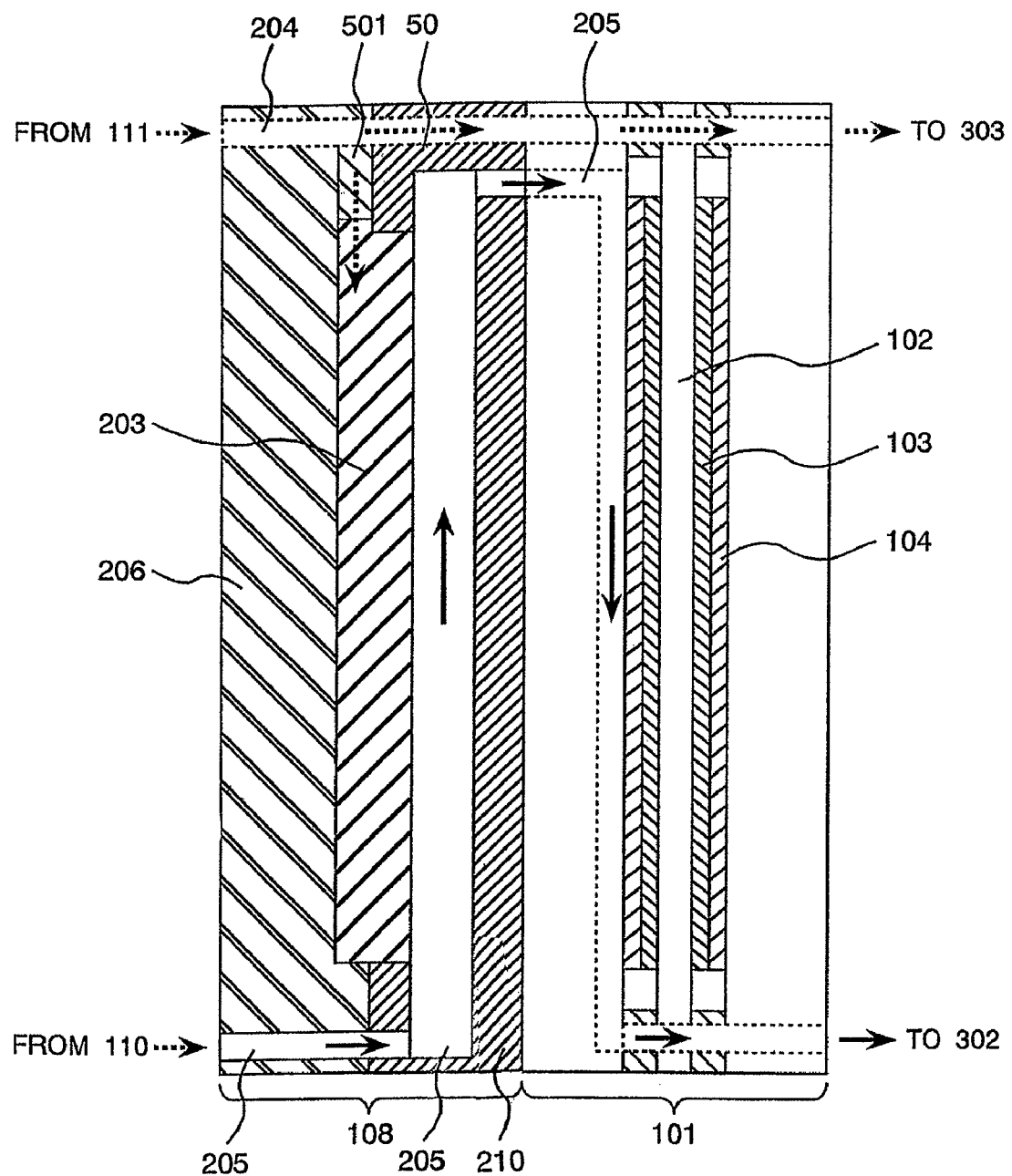
FIG. 5 shows a cross-sectional view of a humidifier using a porous filter and its vicinity.

The reference numerals 210 and 50 in both FIGS. 2 and 5 respectively represent a member for connecting the humidifier 108 to the unit cells 101, and a wall of the member 210 for holding the humidifier 108 in contact with the water channel 204.

The PEFC 100 is generally used with the separator having fuel gas flow channels placed upright. Similarly, the humidifier 108 and the water permeable membrane 201 are also held vertically in the PEFC. As the result, the humidifying water taken into the water permeable membrane 201 goes down by gravitation and causes the lower part of the water permeable membrane 201 to swell. This may block the gas flow channels adjacent to the water permeable membrane, reduces the humidification rate, and increases a gas pressure loss. To solve these problems, it is possible to provide a water-repellent porous material (not shown in the Figures) on the anode gas channel side of the water permeable membrane 201. This can prevent blockage of anode gas flow channels and reduction of humidification rate also in the lower part of the humidifier 108. The reason for "water-repellent" is that the hydrophilic material condenses the humidifying water in its micro-pores before the humidifying water evaporates and this deteriorates the gas humidification.

Carbon paper, carbon cloth, metal mesh, porous metal material and so on are available as the porous materials.

Figure 3:
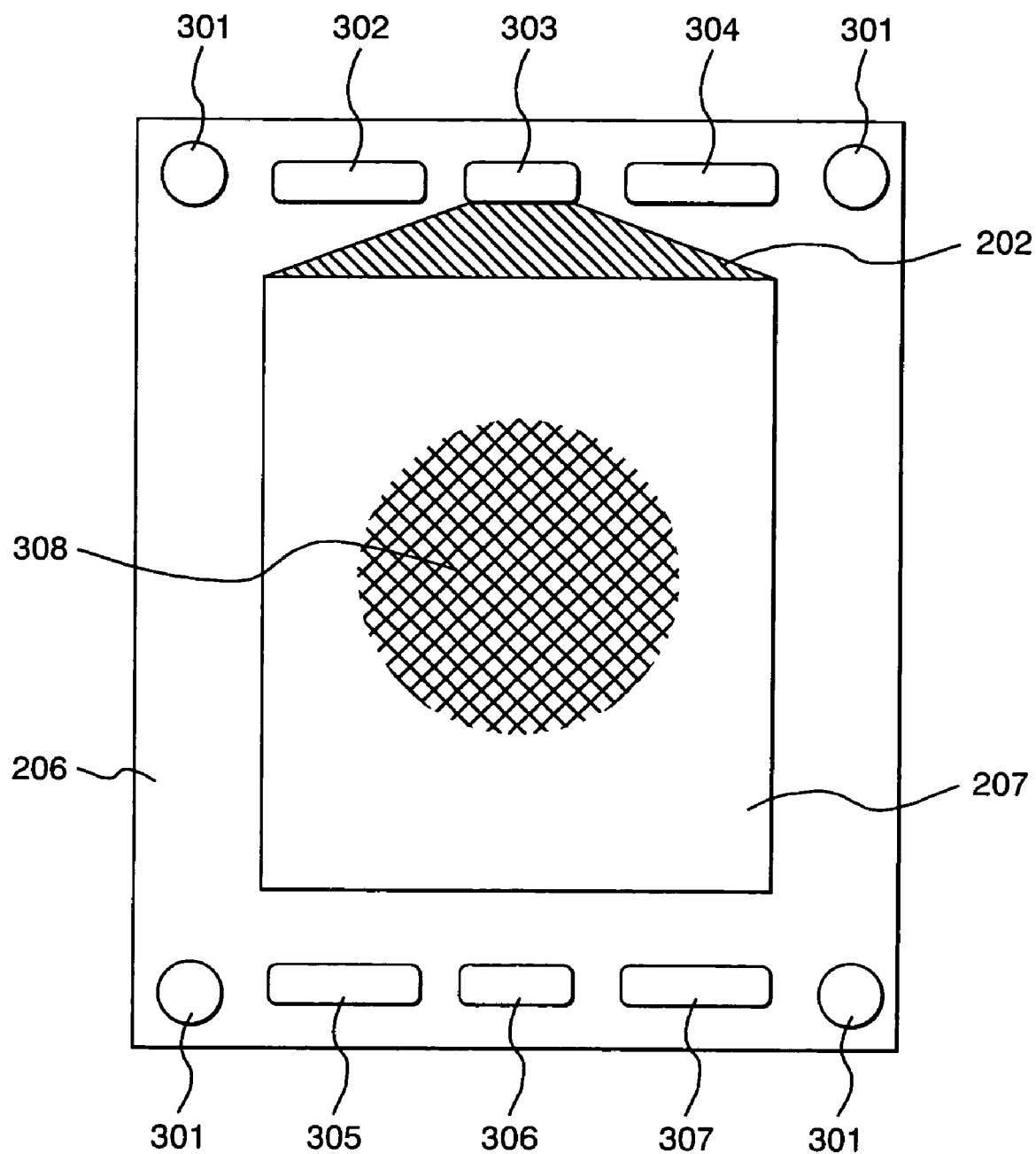
FIG. 3 shows a water retaining layer holder used in this invention.

FIG. 3 shows a right side view of the water retaining layer holder 206. The humidifying water inlet 202 is a water regulating part that prevents excessive water from entering the water retaining layer 203.

In this embodiment, the water retaining layer 203 is 180 microns thick and the humidifying water inlet 202 is 100 microns thick. The porosity of the humidifying water inlet 202 is 0.8 although the porosity of the water retaining layer 203 is 0.9.

The water retaining layer holder 206 is equipped with anode gas flow channels 302 and 307, cathode gas flow channels 304 and 305, cooling water flow channels 303 and 306, and bolt holes 301.

Figure 4:
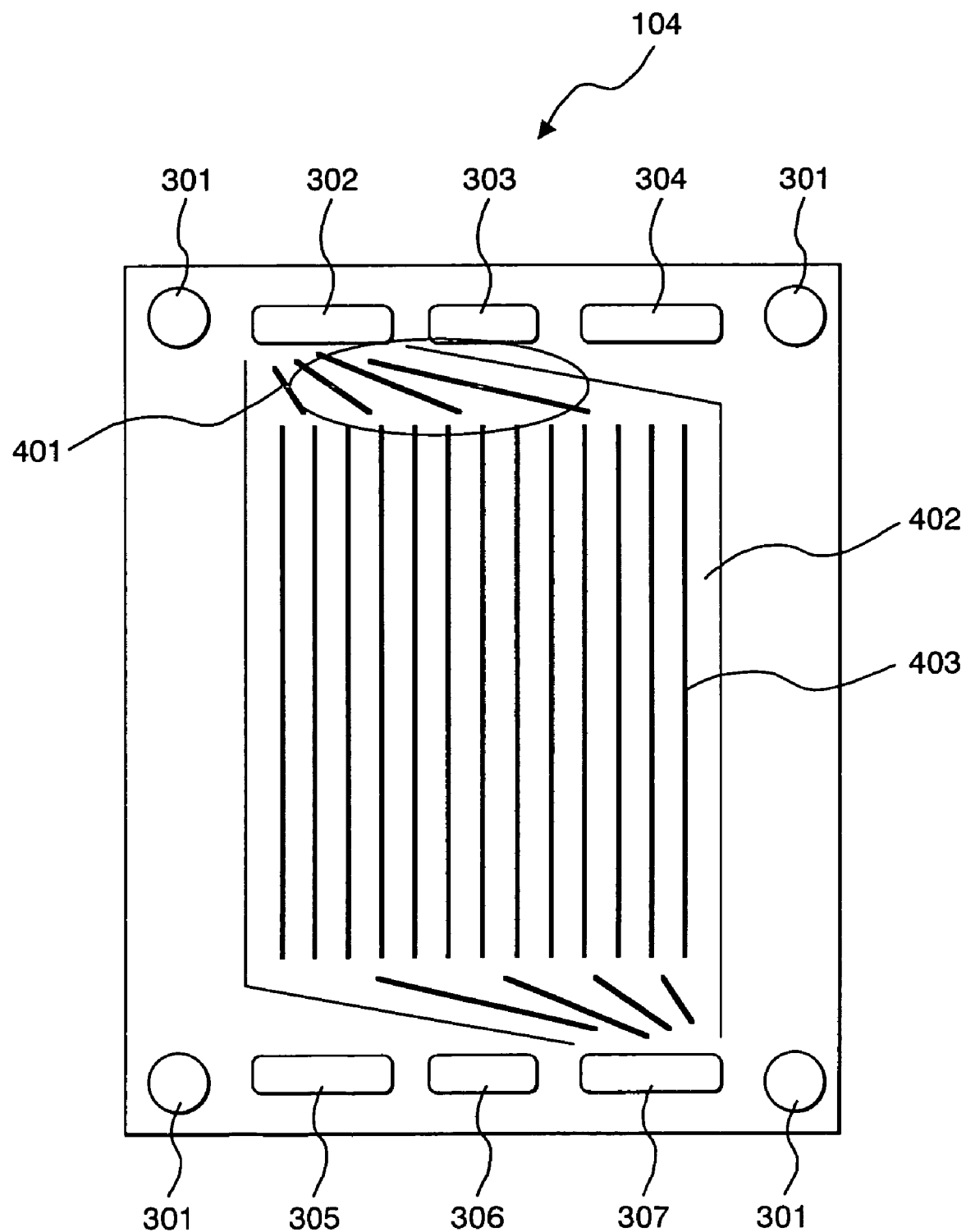
FIG. 4 shows a front view of the unit cell separator on anode side used in this invention.

FIG. 4 shows the surface of the unit cell separator 104 for a unit cell 101 in the PEFC 100 over which the anode gas flows. (This surface is called an anode surface.) The anode gas is fed from the anode gas flow channel 302, flows through the gas distribution section 401 that is provided to distribute the gas over the whole separator and then through the gas flow channels 402 partitioned by gas distribution ribs 403, and goes out from the anode gas flow channel 307. The bolt holes 301 are used to tighten the cell assembly with bolts. The cooling water flow channels 303 and 306 in the top and bottom centers of the cell separator 104 are used to flow cooling water. The manifolds 304 and 305 in the end are used to flow the cathode gas.

The unit cell separator 104 of FIG. 4 has its rear surface over which the cathode gas flows. (This surface is called a cathode surface.) The location of the manifolds 302 and 304 on the top and 305 and 307 on the bottom on the cathode surface are reverse to that of manifolds on the anode surface. The cathode gas is fed from the cathode gas flow channel 304, flows through the gas distribution section and the gas flow channels, and goes out from the anode gas flow channel 305. The MEA 120 and the gas distribution layer 106 are sandwiched between this cathode surface and the anode surface of the other unit cell separator as shown in FIG. 1. In this way, a unit cell 101 of FIG. 1 is constructed.

The humidifier 108 comprises a water permeable membrane 201, a water retaining layer 203, a humidifying water inlet 202, a member for connecting the humidifier to the cell assembly, and a packing. This humidifier is connected to the cell assembly of the unit cell 101 with the water permeable membrane 201 interposed.

It is possible to provide one or more humidifiers 108 on the end(s) of a cell assembly or to provide the humidifier for each unit cell or for a set of unit cells. It is preferable, as in this embodiment, to provide the humidifier 108 on the upstream end of the unit cell assembly 119 from which the anode gas is supplied. This enables the use of a single humidifier to humidify the anode gas. Although this embodiment is not equipped with a humidifier for the anode gas as the cathode PEM 102 can humidify the gas fully with water generated by power generation, it is possible to provide a cathode gas humidifying means in the cathode gas flow channel. Further, as part of the cooling water is used as humidifying water, the generated heat can be used effectively without depriving excessive heat from the cell assembly.

When the humidifier is placed between two unit cells, the humidifier must be conductive to transfer electrons. Accordingly, parts that hold the water retaining layer and the water permeable membrane must also be conductive. The fuel cell assembly of this embodiment is named S1.

Embodiment 2

The water retaining layer 203 of this embodiment uses a non-woven cloth made of hydrophilic polyethylene and hydrophilic polypropylene prepared by substituting part or all of hydrogen atoms of polyethylene and polypropylene by fluorine atoms and sulphonating them. The sulfonic group must be of the proton type. The water retaining layer 203 is bonded to the water permeable membrane 201 with a small amount of monomer that is an electrolyte of the water permeable membrane 201 of Embodiment 1 therebetween as the adhesive. The other components of this embodiment such as unit cell separator 104, MEA 120, and gas diffusion layer are the same as those of Embodiment 1. The PEFC of Embodiment 2 is prepared in the similar manner as Embodiment 1 as shown in FIG. 1. The fuel cell assembly of this embodiment is named S2.

Embodiment 3

Referring to FIG. 5, the humidifying water inlet 202 at which the cooling water from the cooling water flow channel 204 touches the water retaining layer is replaced by a porous carbon filter 501 that has an average micro-pore diameter of 50 microns and porosity of 0.55. The cooling water is supplied to the water retaining layer through this porous carbon filter 501. This can omit the water permeable membrane 201 of Embodiment 1 as the porous carbon filter 501 can control the flow rate of part of the cooling water from the cooling water flow channel to the water retaining layer 203. In other words, this embodiment can control the water content of the water retaining layer by the porous carbon filter 501 and let the water retaining layer directly humidify the gas even when the water permeable membrane 201 is not provided.

We inventors tested the humidifying performance of this embodiment using porous carbon filters of average micro-pore diameters of 50, 75, 100, 150, and 200 microns and found that these porous carbon filters can humidify fuel gases similarly.

The cell stack of this embodiment is prepared by using a porous carbon filter of 100 microns in average micro-pore diameter for the humidifier and the other components which are the same as those of Embodiment 1. The fuel cell assembly of this embodiment is named S3.

COMPARATIVE EXAMPLE

This embodiment uses a humidifier comprising a water permeable membrane 201 only (excluding the water retaining layer 203 of FIG. 2). The water permeable membrane is the same as that 201 of Embodiment 1. The humidifying water inlet 202 has ten 0.5 mm-diameter holes to supply part of the cooling water to the humidifier 108. The other configuration of this example except the humidifier 108 is the same as that of Embodiment 1. The fuel cell assembly of this example is named R1.

Another example R2 is prepared having the same configuration as the Example R1 except that the water permeable membrane 201 uses a polytetrafluoroethylene membrane of 0.05 micrometer in average micro-pore diameter.

Embodiment 4

We inventors tested the fuel cell assemblies S1, S2, and S3 of Embodiments 1, 2, and 3 and the fuel cell assembly R1 of Comparative example R1 under conditions of:

supplying a mixture of 70%-by volume of hydrogen gas and 30%-by volume of carbon dioxide gas to the anode through the humidifier 108 to humidify thereof, supplying air as the cathode gas to the unit cells 101 directly without humidifying thereof, and keeping the unit cell temperature at 70° C. and the inlet temperature of the cooling water at 60° C. to initially supply hot water of 60° C. to the humidifier 108, assuming that the outside air temperature is 25° C.

The conditions also contain that 70% of hydrogen and 40% of oxygen are used for power generation, that respective currents are fixed, and that the gases are supplied at normal pressures.

First, we supplied dry gases (having a dew point of −20° C.) required to generate electricity of 0.5 mA/cm$^2$ to the cell assemblies without a load and measured the humidification rates of gases that passed the cell assemblies by a mirror-type dew-point hygrometer. The anode gases humidified by the humidifiers of the cell assemblies S1, S2, and S3 without a load could have a dew point of 60 to 65° C., which is approximately equal to the cell temperature during power generation. Contrarily, the cell assembly R1 of Comparative Example 1 could assure the dew point of 60 to 65° C. but increased the pressure loss of the anode gas from 50 to 190 mmH$_2$O. It is known that this pressure loss is caused by a blockage of the anode gas flow channel due to the swelling of the membrane. The cell assembly R2 of Comparative Example 2 clears this pressure loss problem but the dew point of the humidified anode gas is very low (25° C.), which means insufficient humidification rate.

Embodiment 5

In succession to Embodiment 4, we carried out a continuous power generation test on each of cell assemblies $S_1$, $S_2$, and $S_3$ of Embodiments 1, 2, and 3 under the power generation test conditions of Embodiment 5. The current density in this running test is 0.5 mA/cm$^2$.

The voltage drops of the cell assemblies $S_1$, $S_2$, and S3 were very small in continuous power generation. The mean voltage drops of cell assemblies $S_1$, $S_2$, and S3 are respectively 9, 12, and 13 mV (in that order) after power generation of 1000 hours.

On the contrary, the cell assembly $R_1$ of Comparative Example 1 increased the pressure loss of the anode gas from 50 to 190 mmH$_2$O and the mean voltage drop to 120 mV after power generation of 1000 hours. Further, the mean voltage drop of the cell assembly R2 of Comparative Example 2 was very great (450 mV) after power generation of 1000 hours as the gas humidification was insufficient.

Embodiment 6

We kept the cell assemblies $S_1$, $S_2$, and $S_3$ in a temperature-controlled room whose temperature could be kept at −5° C. and 25° C. and carried out a continuous power generation test on them. The test conditions were: continuous power generation at a room temperature of 25° C. for 14 hours, current density of 0.2 mA/cm², hydrogen use ratio of 70%, and oxygen use ratio of 40%. After this test cycle is completed, we cooled the test room including the cell assemblies from 25° C. to −10° C. in 2 hours with each cell assembly filled with the anode gas and the cathode gas and without any gas flow. In this case, each cell assembly has no loaded and stops power generation. After the room temperature reaches −5° C., we kept the test room at −5° C. for 6 hours, increased the room temperature again to 25° C. in 2 hours, and started the second test cycle. We repeated this test cycle (comprising the steps of power generation, cooling, leaving still, and warming) once a day for 30 days.

After this temperature cycle test was completed, we carried out a power generation test on the cell assemblies under the conditions of Embodiment 5. As the result of this temperature cycle test, we know that the cell assemblies of Embodiments 1, 2, and 3 have their performances reduced little and the voltage drops are only 20 to 30 mV after the temperature cycle test. Contrarily, the cell assemblies of Comparative Examples 1 and 2 have great voltage drops (250 to 310 mV). When disassembling the tested cell assemblies, we detected some breaks on the membrane of the humidifier. We assumed that these membrane breaks were caused by freezing of excessive water in the humidifier. Additionally, we detected no break in humidifier membranes of cell assemblies S1, S2, and S3 after disassembling.

Embodiment 7

When the water retaining layer 203 having a mean micro-pore diameter in Embodiment 1 is hydrophilic, the water retaining layer can solely humidify the anode gas even without the water permeable membrane 201. In other words, it is possible to humidify the anode gas by causing the water retaining layer 203 to hold part of water supplied to the cell or water that is supplied directly from the outside and causing the wet water retaining layer 203 to directly touch the anode gas.

This has the following merits: simplified humidifying mechanism without the water permeable membrane 201, Increase of humidification rate due to provision of no water permeable membrane 201, and arbitrary shape and disposition off the water retaining layer 203. Preferred materials available to the water retaining layer 203 can be hydrophilic porous materials prepared by making polytetrafluoroethylene, polystyrene or copolymer of styrene and butadiene hydrophilic. The humidification rate can be controlled by changing the contact area between the water retaining layer 203 and the anode gas.

The cell assembly S7 of Embodiment 7 is prepared in the same configuration as that of Embodiment 1 except that the water permeable membrane 201 is not provided. We tested this cell assembly S7 under conditions of supplying a mixture of 70%-by volume of hydrogen gas and 30%-by volume of carbon dioxide gas to the anode through the humidifier of this invention to humidify thereof, supplying air as the cathode gas to the unit cells 101 directly without humidifying thereof, and keeping the unit cell temperature at 70° C. and the inlet temperature of the cooling water at 60° C. to initially supply hot water of 60° C. to the humidifier 108 of FIG. 1, assuming that the outside air temperature is 25° C.

The conditions also contain that 70% of hydrogen and 40% of oxygen are used for power generation, that respective currents are fixed, and that the gases are supplied at normal pressures.

First, we supplied dry gases (having a dew point of −20° C.) required to generate electricity of 0.5 mA/cm² to the cell assemblies without a load and measured the humidification rates of gases that passed the cell assemblies by a mirror-type dew-point hygrometer. The anode gases humidified by the humidifiers of the cell assemblies $S_1$, $S_2$, and $S_3$ without a load could have a dew point of 65 to 67° C., which is approximately equal to the cell temperature during power generation. When compared by the cell assembly $S_1$ of Embodiment 1, the cell assembly S7 can humidify the anode gas directly by the water retaining layer as the water permeable membrane is not provided and consequently increase the humidification rate of the anode gas. In other words, the water retaining layer of the cell assembly $S_7$ can be smaller when the humidification rate is fixed. Consequently, this is effective in making the fuel cell assembly compact.

Embodiment 8

When the humidifier employs the water permeable membrane 201, the anode gas leaks towards the water while diffusing in the water permeable membrane 201 and prevents the humidifying water from transferring into the water permeable membrane. To solve this problem, a method is provided to eliminate the anode gas that diffuses in the water permeable membrane 201.

This method utilizes a fact that the micro-pore diameter of the porous material of the water retaining layer 203 is much greater than that of the water permeable membrane 201. In other words, as it is very easy to disperse metal catalyst or metal oxide catalyst in micro-pores of the water retaining layer 203, a catalyst having a function of oxidizing hydrogen three-dimensionally is dispersed in the water retaining layer 203. This structure has the merits below. For example, the water permeable membrane 201 becomes wet and dry repeatedly by the anode gas as the PEFC starts and stops. So, when provided on the surface of the water permeable membrane 201, the catalyst layer will break or separate from the water permeable membrane by shrinking and swelling of the water permeable membrane 201 and gradually loses the function of oxidizing hydrogen. Contrarily, when the cell assembly uses the water retaining layer 203 having catalyst dispersed in it, the catalyst will be rarely deteriorated because the water retaining layer 203 itself is not in direct contact with the gas and rarely affected by the water content as the PEFC starts and stops. Further, the catalyst can be easily dispersed in the porous material that constitutes the water retaining layer 203 at a low cost as the porous material has a great micro-pore diameter. Furthermore, the catalyst dispersed in the water retaining layer can oxidize hydrogen dissolved in water more quickly and efficiently than the catalyst layer attached to the surface of the water permeable membrane 201.

Fine platinum particles, carbon particles on which platinum particles are dispersed, and titanium oxide are available as the catalyst. Any catalyst is available as long as it has a function to oxidize hydrogen. There are various methods of dispersing these catalyst in the water retaining layer 203: a method of directly impregnate the water retaining layer 203 with catalyst particles and a method of depositing metal particles in the water retaining layer by a sol-gel reaction such as the alcoxide method or by adding a reducing agent such as formaldehyde, hydrazine, or hydrogen peroxide.

Referring to FIG. 2, we prepared a catalyst-dispersed water retaining layer by dipping the water retaining layer in a catalyst-suspended alcohol liquid which suspends platinum-plated graphite particles (mean grain size of 0.1 micrometer) in alcohol such as ethanol, vacuum-dried thereof, and secured it by the water retaining layer holder. We prepared a fuel cell assembly $S_8$ using this water retaining layer and the water permeable membrane in the manner similar to Embodiment 1.

We tested the humidification of the anode gas of the cell assembly $S_8$ under the conditions similar to those of Embodiment 1 and found that the humidified gas had a dew point of 65 to 67° C. Therefore it is apparent that the water retaining layer of this embodiment has no influence on humidification of the anode gas. Further, the water retaining layer of this embodiment can facilitate provision of a mechanism to oxidize hydrogen that passes through the water permeable membrane and remove it as water by a simple method. After the power generation test, we measured the quantity of hydrogen left in the cell assembly by substituting hydrogen gas in the cell assembly by nitrogen gas using the anode gas port 110 and the cathode gas port 112 of the cell assembly (FIG. 1), closing one of the cooling water ports, sucking the gas from the other cooling water port, and measuring the quantity of hydrogen gas in the sucked gas by a gas chromatography or the like. We found that there was no remaining hydrogen gas in the sucked gas. This means that the water retaining layer of this embodiment can completely oxidize hydrogen that passes trough the water permeable membrane.

Embodiment 9

Figure 6:
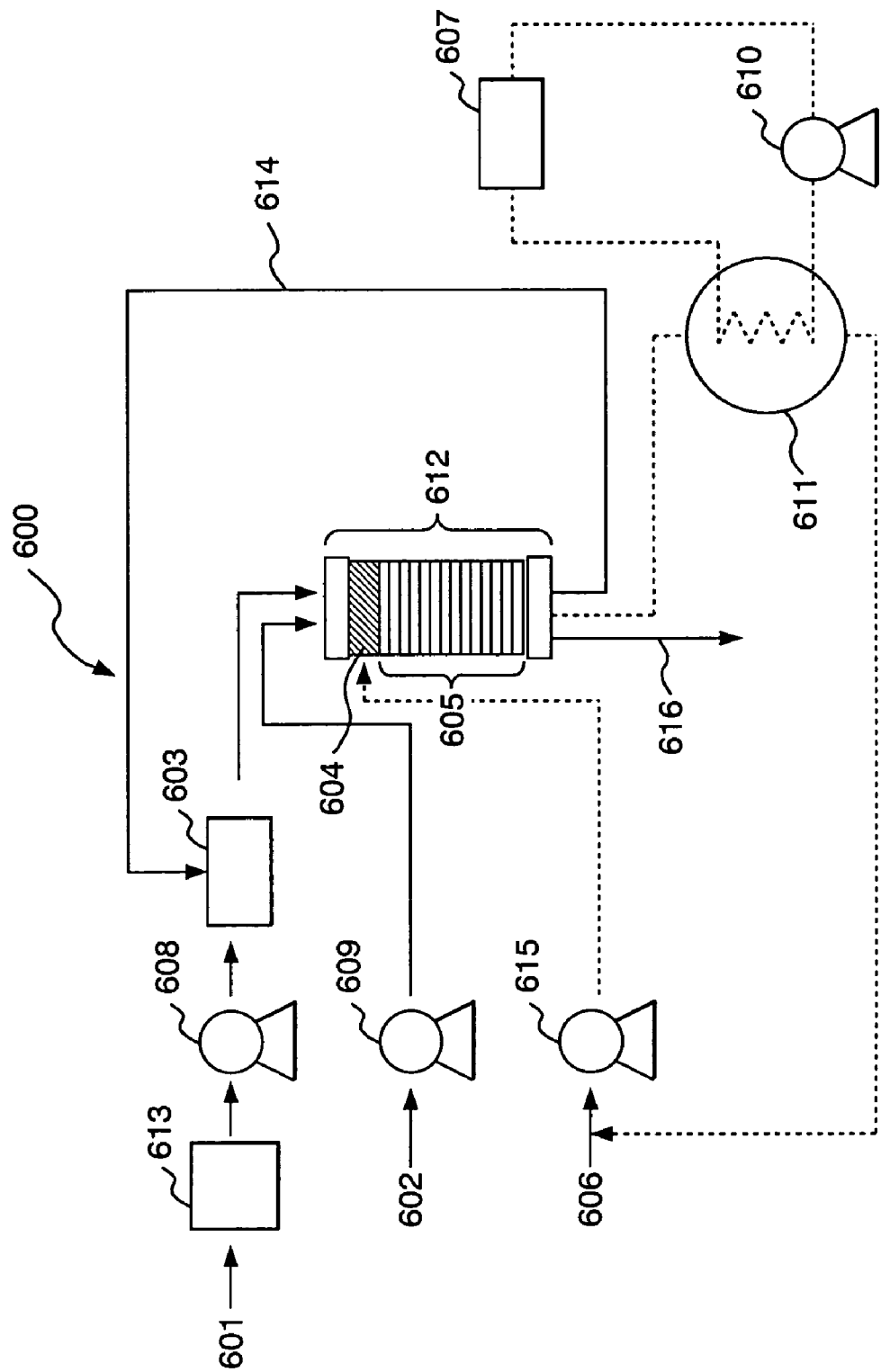
FIG. 6 shows a schematic diagram of a power generation system using the fuel cell assembly of an embodiment of this invention.

FIG. 6 shows a schematic diagram of a power generation system having a PEFC of this invention.

The natural gas (containing hydrogen) 601 to be supplied to the anode is obtained by reforming the natural gas (sent from the pump 608) with steam by the reformer 603 and contains hydrogen gas of 30 to 80% by volume. The reformer 603 contains a catalyst having a function that selectively oxidizes a small amount of carbon monoxide (CO) to prevent a voltage drop of the fuel cell assembly 612. If the raw gas (natural gas) contains any harmful impurity (such as sulfur and the like) that deteriorates the function of the catalyst in the reformer 603, an impurity remover 613 must be provided in the upstream side of the reformer 603. The hydrogen gas that is left unreacted in the anode gas is returned to the reformed through the anode gas exhaust pipe 614.

Air 602 as a cathode gas is supplied to the fuel cell assembly 612 by the pump 609. The reacted cathode gas is exhausted from the fuel cell assembly 612 through the cathode gas exhaust pipe 616.

Distilled water 606 as the humidifying water is supplied to the fuel cell assembly 612 by the pump. This embodiment uses an identical pipe to supply the humidifying water and the cooling water. In the cell assembly 605 comprising separators, membranes, and electrodes, the humidifying water is sent to the humidifying section 604 (equivalent to 108 of FIG. 1) and the cooling water is sent to the cooling water separator 107 of FIG. 2. The cooling water deprives the cell assembly of the reaction heat, becomes hot, and transfers the heat to the water in the hot water tank 607 by the heat exchange 611. The circulation pump 610 circulates water forcibly.

Besides the water supplying method of this embodiment, it is possible to supply the humidifying water by another pump to supply it independently of the cooling water.

The fuel cell assembly of this system generates a direct current power. It is also possible to provide an inverter circuit to turn direct current to alternate current for home use. Further, this fuel cell assembly can be used for the other applications, for example, as a power supply for electric automobiles. In this application, the reformer 603 can be substituted by a hydrogen container, a hydrogen storing apparatus, or the like. The hot water tank 607 can be omitted and the heat exchange 611 for exchanging heat with the water in the hot water tank 607 can be replaced by an air-cooler for simple and easy heat exchange.

The fuel cell assembly of this invention can humidify the fuel gas, keeping a low pressure loss of the fuel gas.

What is claimed is:

1. A fuel cell assembly comprising a humidifier and a plurality of fuel cell units, wherein each of the fuel cell units comprises an electrolyte membrane, a cathode adjacent to one face of the membrane, an anode adjacent to the other face of the membrane, a gas diffusion layer adjacent to the cathode, a gas diffusion layer adjacent to the anode, a separator having a flow channel on one face thereof for flowing oxidizing gas, which is adjacent to the cathode, and a separator having a flow channel for flowing fuel gas, which is adjacent to the anode, wherein the humidifier comprises a porous water-retaining layer for retaining water supplied thereinto, and a holder for the water-retaining layer, wherein a surface of the holder for the water-retaining layer and an adjacent surface of the water-retaining layer are in contact over entire surfaces thereof, wherein the water-retaining layer is made of a hydrophilic polymer material, said porous water-retaining layer being in communication with a channel containing water by way of a filter between said channel and said water-retaining layer for passing water, but not gas, from said channel to said water-retaining layer, said channel containing water exclusively supplying water to the water-retaining layer, supplying water thereto via the filter, wherein the water-retaining layer communicates with the channel containing water by way of the filter, which is disposed at a position where the cooling water inlet and the water-retaining layer communicate with each other, wherein the water-retaining layer takes water thereinto at a peripheral portion thereof, where the water-retaining layer is in contact with cooling water, and wherein the humidifier adjoins an end of the plurality of fuel cell units in such a relation that the water-retaining layer faces the flow channels thereby to transfer water introduced into the water-retaining layer to the fuel gas and/or oxidizing gas flowing in the flow channels, the flow channels for flowing gases being partitioned with a wall from the channel containing water.

2. The fuel cell assembly according to claim 1, said fuel cell assembly having a single humidifier.

3. The fuel cell assembly according to claim 1, wherein the water-retaining layer comprises a hydrogen oxidation catalyst dispersed in a porous member.

4. The fuel cell assembly according to claim 1, wherein said filter is a porous carbonaceous filter.

5. The fuel cell assembly according to claim 1, wherein the water-retaining layer is positioned and has structure such that water osmoses into and through the water-retaining layer by capillary action so as to be supplied from said channel to the flow channels thereby to transfer water introduced into the water-retaining layer to the fuel gas and/or oxidizing gas flowing in the flow channels.

6. A fuel cell assembly comprising:
a unit fuel cell comprising a membrane electrode assembly;
a humidifier comprising:
a water-retaining layer for retaining water therein, said water-retaining layer being made of hydrophilic porous material,
a water permeable layer in face-to-face contact with said water-retaining layer for humidifying gas in the gas channel of a separator, said water permeable layer being made of a hydrophilic porous material that passes water, but not gas;

the separator having a gas channel facing said water permeable layer on one face and facing the membrane electrode assembly on the other face; and a humidifier holding member for holding peripheries of the water-retaining layer, water permeable layer, and unit fuel cell, wherein the humidifier holding member, which is partitioned from a gas flow channel with a wall member, is provided with a water flow channel therein to exclusively supply water to the water-retaining layer.

7. The fuel cell assembly of claim 6, wherein the thickness of a humidifying water inlet of said humidifier is ½ to ¾ of the thickness of said water-retaining layer.

8. The fuel cell assembly of claim 6, wherein said water permeable layer is 0.01 to 0.1 micrometer on a mean micro-pore diameter and 10 to 100 micrometers thick.

9. The fuel cell assembly of claim 6, wherein said water permeable layer has a porosity of 50 to 90%.

10. The fuel cell assembly of claim 6, wherein said water permeable layer is one or more layers that are treated to be hydrophilic and are selected from the group consisting of polytetrafluoroethylene, polystyrene, and copolymers of styrene and butadiene.

11. A power generation system comprising an apparatus which produces or stores a hydrogen containing gas and a fuel cell assembly connected to said apparatus with a piping through which said fuel gas flows, wherein said fuel cell assembly of claim 6 generates electricity using said fuel gas from said apparatus.

12. The fuel cell assembly according to claim 6, wherein the water-retaining layer has a mean micro-pore diameter of 10 to 300 μm and a thickness of 50 to 300 μm, whereby water is retained by capillary force by said water-retaining layer when the at least one unit fuel cell is not working and is taken by the at least one of the oxidizing gas and the fuel gas against the capillary force, when the at least one unit fuel cell is working.

13. A fuel cell assembly of claim 6, wherein the hydrophilic water-retaining layer has a mean micro-pore diameter of 10 to 300 μm and a thickness of 50 to 300 μm, and is provided to be in contact with the water permeable layer, said water permeable layer facing flow channels of fuel gas and oxidizing gas of said unit fuel cell and has one surface to supply water to said flow channels, whereby water is retained by capillary force by said water-retaining layer when the unit fuel cell is not working and is taken by gas fed to said anode and gas fed to said cathode against the capillary force when the unit fuel cell is working; and water is supplied from only a part of a surface opposite to the water supplying surface and/or from the outer edge of said water-retaining layer.

14. The fuel cell assembly according to claim 6, having at least two water-retaining layers.

15. The fuel cell assembly according to claim 6, wherein said water-retaining layer is a polypropylene non-woven cloth or a polyethylene-polypropylene non-woven cloth that is made hydrophilic.

16. The fuel cell assembly according to claim 6, wherein the water-retaining layer takes water thereinto at a peripheral portion thereof, where the water-retaining layer is in contact with cooling water.

17. The fuel cell assembly according to claim 6, said fuel cell assembly having a single humidifier.

18. The fuel cell assembly according to claim 6, wherein the water-retaining layer comprises a hydrogen oxidation catalyst dispersed in a porous member.

19. The fuel cell assembly according to claim 6, further comprising a holder for the water-retaining layer, and wherein a surface of the holder and an adjacent surface of the water-retaining layer are in contact over entire adjacent surfaces thereof, and a surface of the water-retaining layer and an adjacent surface of the water permeable layer are in contact over entire adjacent surfaces thereof.

20. A fuel cell assembly comprising:
a unit fuel cell comprising a membrane electrode assembly; and
a humidifier comprising:
a water-retaining layer for retaining water therein, said water-retaining layer being made of hydrophilic porous material;
a separator having a gas channel facing the water-retaining layer on one face and facing the membrane electrode assembly on the other face;
a filter made of a hydrophilic porous material being disposed between (a) a water channel for supplying water to the water-retaining layer, and (b) the water-retaining layer; and
a humidifier holding member for holding peripheries of the water-retaining layer and the unit fuel cell, wherein the water-retaining layer supplies water to gas passing in the gas channel to humidify it, and wherein the humidifier holding member, which is partitioned from a gas flow channel with a wall member, is provided with the water channel therein to exclusively supply water to the water-retaining layer, supplying the water thereto via the filter.

21. The fuel cell assembly of claim 20, wherein the water-retaining layer of said humidifier has a carbonaceous porous filter.

22. A fuel cell assembly of claim 20,
wherein, the water-retaining layer is made of a hydrophilic porous member having a mean micro-pore diameter of 10 to 300 μm and a thickness of 50 to 300 μm, whereby water is retained by capillary force by said water-retaining layer when the stack of unit fuel cells is not working and is taken by gas fed to an anode of said unit fuel cell and gas fed to a cathode of said unit fuel cell by means of said water permeable layer against the capillary force when the unit fuel cell is working, said water-retaining layer being communicated with the water flow channel by means only of a porous humidifying water inlet means.

23. The fuel cell assembly according to claim 20, wherein a carbonaceous porous filter controls flow rate of water to the water-retaining layer.

24. The fuel cell assembly according to claim 20, wherein the water-retaining layer comprises a hydrogen oxidation catalyst dispersed in a porous member.

25. The fuel cell assembly according to claim 20, further comprising a holder for the water-retaining layer, and wherein the holder is in face-to-face contact over an entirety of a surface of the water-retaining layer adjacent thereto.

26. A fuel cell assembly comprising a humidifier and a plurality of fuel cell units, wherein each of the fuel cell units comprises an electrolyte membrane, a cathode adjacent to one face of the membrane, an anode adjacent to the other face of the membrane, a gas diffusion layer adjacent to the cathode, a gas diffusion layer adjacent to the anode, a separator having a flow channel on one face thereof for flowing oxidizing gas, which is adjacent to the cathode, and a separator having a flow channel for flowing fuel gas, which is adjacent to the anode, wherein the humidifier comprises a water permeable layer, a porous water-retaining layer for retaining water supplied thereinto, and a holder for the water-retaining layer, wherein a surface of the holder for the water-retaining layer and an adjacent surface of the water-retaining layer are in contact over entire adjacent surfaces thereof, and a surface of the water-retaining layer and an adjacent surface of the water permeable layer are in contact over entire adjacent surfaces thereof, wherein the water-retaining layer is made of a hydrophilic polymer material, said porous water-retaining layer being in communication with a channel containing water by way of an edge of the water-retaining layer in contact with the channel, for passing water, but not gas, said channel containing water exclusively supplying water to the water-retaining layer, supplying water thereto via the edge of the water-retaining layer, wherein the water-retaining layer communicates with the channel containing water by way of the edge of the water-retaining layer, which is disposed at a position where the cooling water inlet and the water-retaining layer communicate with each other, wherein the water-retaining layer takes water thereinto at a peripheral portion thereof, where the water-retaining layer is in contact with cooling water, and wherein the humidifier adjoins an end of the plurality of the fuel cell units in such a relation that the water-retaining layer faces the flow channels thereby to transfer water introduced into the water-retaining layer to the fuel gas and/or oxidizing gas flowing in the flow channels, the flow channels for flowing gases being partitioned with a wall from the channel containing water.

27. The fuel cell assembly according to claim 26, wherein the water-retaining layer is positioned and has structure such that water osmoses into and through the water-retaining layer by capillary action so as to be supplied from said channel to the water permeable layer and then to the flow channels thereby to transfer water introduced into the water-retaining layer to the fuel gas and/or oxidizing gas flowing in the flow channels.

28. The fuel cell assembly according to claim 26, wherein the water-retaining layer comprises a hydrogen oxidation catalyst dispersed in a porous member.

* * * * *